Patented June 17, 1952

2,600,415

UNITED STATES PATENT OFFICE 2,600,415

WATER-SOLUBLE SURFACE ACTIVE AGENTS FROM OLEFIN POLYMERS

Louis A. Mikeska, Westfield, N. J., assignor to Standard Oil Development Company, a corporation of Delaware No Drawing. Application December 26, 1946, Serial No. 718,621

2 Claims. (Cl. 260—513)

This invention relates to the preparation of new and useful products from branched chain olefin polymers containing tertiary carbon atoms. More particularly, it is concerned with providing potent wetting agents by forming sulfonates of suitable propylene polymers.

Generally, it is known that aliphatic hydrocarbons do not react with sulfuric acid in the same manner as aromatic hydrocarbons to form sulfonic acids. Sulfonic acids are derived from some paraffin hydrocarbons by indirect methods. Straight chain olefins combine with sulfuric acids to form sulfates. Very little information has been available with respect to the reactions of branched olefins on account of variations and complexities of branched olefin structures.

I have found that certain fractions of propylene polymers are particularly adapted for synthesizing polar compounds of definite qualities even though these polymers are branched olefins of varied structures. I have found that exceptionally good surface active agents can be derived from various isomers present in pentamer and hexamer fractions obtained in a selective polymerization of propylene.

A primary object of this invention is to provide satisfactory utilization of propylene polymers in synthesizing valuable organic polar derivatives of definite characteristics.

A further object is to provide compositions of controlled characteristics, such as tertiary alkenyl sulfonates of high wetting power by synthesis from isomers in certain propylene polymer fractions.

Although most attention is given to the sulfonate derivatives for purposes of illustration, it is to be understood that other polar derivatives of controlled characteristics are provided also.

To obtain a selective formation of the propylene polymers best utilized, and herein referred to as polypropylenes, propylene is treated with the Friedel-Crafts catalyst $BF_3$, or its equivalent, at a temperature above 0° C. in the presence of a small amount of a polar compound to activate and control the catalyst. The most useful polar compounds for activating and controlling the catalyst are oxygenated organic compounds, e. g., alcohols, ethers, and the like. A polar inorganic compound, such as water, may be used in small amounts, but is less suitable in certain respects. The polar activating compound should be used in a proportion less than the molar proportion of the catalyst, otherwise the polymerization is stopped.

The controlled polymerization of propylene is successfully carried out in a continuous process by admixing a feed stream of liquid propylene at a constant feed rate with $BF_3$ and a small amount of polar activating compound in a reaction zone, wherein a controlled temperature in the range of 0° C. to 91.4° C. is maintained by cooling the reaction mixture and the propylene is kept liquid under sufficient pressure in the range of 10 to 100 atmospheres, and after steady conditions are obtained, the polymer product is removed from the reaction zone, preferably at a lower volumetric rate of flow than the feed rate of the liquid propylene.

The propylene polymer product removed from the reaction zone is given a finishing treatment, which, in general, comprises separation of excess catalyst by releasing pressure, removal of residual catalyst from the polymer liquid by washing with an alkaline solution, such as aqueous caustic solution, filtering through an adsorbent for clarifying the polymer oil, and vacuum fractional distillation to obtain a number of fractions.

Fractions of propylene polymers obtained in a typical continuous controlled propylene polymerization reaction are set forth as follows:

TABLE I

*Effect of operating variables of propylene polymerization reaction in continuous unit*

Feed:
  $C_3$ cut of 85% propylene—15% propane 1 mole percent $BF_3$

Activator—Isopropyl ether 0.5 vol. percent of feed
Pressure—190 p. s. i. g.

| Run | A | B | C | D |
|---|---|---|---|---|
| Bath Temperature, °C | 18 | 17 | 50 | 50 |
| Propylene Feed Rate, V./V./hr | 1.2 | 0.75 | 0.75 | 1.2 |
| Weight Percent Conversion on Propylene | 97 | 98 | 92 | 32 |
| Product Distribution B. Pt. at 760 mm. Hg, °C.: | | | | |
| $C_9$, 125–165 | Trace | Trace | 3 | 6 |
| $C_{12}$, 165–220 | 14 | 7 | 22 | 40 |
| $C_{15}$, 220–280 | 21 | 21 | 33 | 39 |
| $C_{18}$, 280–320 | 29 | 44 | 28 | 8 |
| $C_{21}$, 320–350 | 17 | 10 | 6 | 6 |
| $C_{24}+$, 350+ | 19 | 18 | 8 | 1 |

Analytical results indicate that the polypropylenes contain tertiary carbon constituents, i e., carbon atoms bonded to hydrogen and three other carbon atoms, and contain a double bond which shifts to various positions, thus forming isomers with different boiling points. Despite the isomeric variations in the polypropylenes, certain fractions into which these polymers can be separated by distillation respond favorably to sulfonation reactions for obtaining surface active agents of outstanding qualities.

Taking into consideration the stated analytical results and method of synthesis, the polypropylene products obtained may be regarded as having a composition represented by the following general formula:

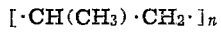

The methyl-ethylene group enclosed by brackets is the structural unit and the subscript $n$ denotes the degree of polymerization or number of combined monomeric units, $n$ being an integer mainly from 4 to 7.

Despite the isomeric variations of the polypropylenes, I have found that the isomeric components within certain boiling ranges react similarly on condensation with acidic reactants to form tertiary alkenyl polar compounds which may be regarded as having the following general composition:

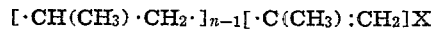

wherein X represents a negative function or anion radical of the acidic reactant; and X is thus attached to the tertiary alkenyl group represented within the brackets. As before, $n$ denotes the number of monomeric propylene units in the polymer.

The polypropylenes react to some extent directly with halo-sulfonic acids or sulfur trioxide, but much more completely with ether or dioxane complexes of the two reagents, to form alkenyl sulfonic acids which on neutralization with alkali or alkaline earth compounds are converted into sulfonates that exhibit high wetting and detergency powers. However, by employing the halosulfonic acids in combination with an ether compound such as dialkyl ether, dioxane, and other compounds containing the C—O—C structure, the yields of alkenyl sulfonic acid are markedly increased. Although in some cases lower mole ratios of ether/ClSO₃H may be advantageously employed, it is preferred, in general, to have this value greater than 1.0.

The sulfonation of the propylene polymers may be carried out by reacting one or more sulfonation agents with the polymers at a suitable temperature in the range of −50° C. to +100° C. The preferred range is −10° C. to +50° C. Aliphatic or cyclic ethers containing one or more oxygen atoms are beneficially used with the sulfonating agent.

Although not essential, a solvent, such as ethers, paraffin hydrocarbons, or any liquid which dissolves one or more of the substances, may be used in the reaction mixtures.

The reaction may be conducted in either a batch or a continuous operation. If an excess of any reactant is employed or if the reaction is not carried to completion, the unreacted materials may be separated from the reaction product and be recycled to the reaction zone. The intermediate polypropylene sulfonic acid may be converted to alkali or alkaline earth salts before or after isolation from the reaction mixture.

A procedure for carrying out the sulfonation of the polypropylene is briefly outlined as follows:

*Example 1*

A three-way flask equipped with a stirrer, a return condenser, a dropping funnel, and a thermometer was charged with 67.2 g. of polypropylene (B. P. 340–370° C. at 760 mm. Hg) and 100 cc. of solvent naphtha. The dropping funnel was charged with a mixture of 23.3 g. (0.2 mole) of chlorosulfonic acid and 23 cc. of dry ethyl ether. The chlorosulfonic acid-ether mixture was then added to the reaction flask drop by drop over a period of 15 minutes. The temperature rose from 31.5° C. to 35.5° C. and the solution turned brown. Much evolution of hydrogen chloride gas took place during the addition of the chlorosulfonic acid. The reaction mixture was then stirred at room temperature for 1½ hours; then 8 g. of sodium hydroxide dissolved in 50 cc. of water was added, with cooling and stirring. A little more diluted sodium hydroxide was added to render the solution permanently basic to litmus. The solution was then diluted with enough ethyl alcohol to make the solvent 75% alcohol.

The alcohol solution was extracted several times with solvent naphtha to remove substances soluble in naphtha.

The naphtha extracts were combined and evaporated to a residue which consisted of 26 g. of waxy soap, called product B. The unextracted aqueous alcohol solution of sulfonated polymer was evaporated to dryness, leaving a residue designated as product A, which consisted of 21 g. of a rather light-colored soft soap. The product A was found to be somewhat effective as a wetting agent and seemed to have good lathering properties although it did not appear to be a very effective detergent, insofar as could be determined qualitatively. The product A in a 0.2 weight per cent concentration gave a clear solution in water. Its wetting number was about 7 seconds as measured by the canvas disc. On addition of 400 parts per million of calcium chloride, the solution became turbid and the wetting time was increased to 24 seconds. On acidification of the solution with sulfuric acid, the wetting time was reduced to 12 seconds.

Further tests demonstrated more particularly the wetting powers of specific polypropylene fractions, as shown in the following example:

*Example 2*

A refinery C₃ stream containing 85% propylene was subjected to polymerization with 1 mole percent BF₃ in a continuous unit employing a residence time of one hour and a temperature of 18° C.–50° C. Small quantities of isopropyl ether (about 1 volume percent with respect to the propylene feed) were added intermittently to the reactor during the polymerization reaction to activate the BF₃ catalyst. The propylene was maintained in liquid phase under pressure of 190 p. s. i. g. Substantially all the propylene was converted to polypropylenes with normal boiling points in the range of 125° C. to 350° C. Residual catalyst was removed from the polymers by washing with aqueous caustic solution. Then the polymers were filtered through an active clay and fractionally distilled under vacuum.

Selected fractions of the propylene polymers obtained by the vacuum fractional distillation were subjected to sulfonation under the same conditions.

Quarter mole quantities of the C₁₂, C₁₅, C₁₈ and C₂₁ fractions of the propylene polymers were each dissolved in 200 cc. of n-heptane and placed in separate glass reaction flasks equipped with mechanical stirrers. Chlorosulfonic acid (0.3 mole) was diluted with an equal volume of diethyl ether and added to each of the hydrocarbon mixtures during one hour. At the end of one hour reaction period a slight excess of 30 weight percent NaOH was added to each reaction mixture and the mixtures were refluxed for one hour. The final mixtures were cooled and oily layers separated were evaporated to dryness on a steam bath.

The following results show the yields of the residues and the relative wetting powers of these products:

TABLE II

| Polypropylene Fraction | B. Pt. Range at 760 mm. Hg, °C. | Weight Per-Cent Yield of Sodium Polypropylene Sulfonate Based on Polymer | Wetting Time for 0.2 Weight Per-Cent Conc. in $H_2O$ |
|---|---|---|---|
| Tetramers, $C_{12}$ | 165–220 | 80 | 13.3 |
| Pentamers, $C_{15}$ | 220–280 | 80 | 2.2 |
| Hexamers, $C_{18}$ | 280–320 | 100 | 5.7 |
| Heptamers, $C_{21}$ | 320–350 | 113 | 12.8 |

The above results indicate that the sulfonates of the pentamer and hexamer fractions have superior wetting power compared to the sulfonates of the lower and higher molecular weight polypropylenes. Comparative data presented in the following tables show that the $C_{15}$ polypropylene sulfonates have excellent wetting powers in comparison to commercially available wetting agents and detergents.

TABLE III

*Relative wetting powers by canvas disc method*

| Product Tested | Wetting Time in Seconds at 0.2 Weight Per-Cent Conc. in Distilled Water |
|---|---|
| Isopropyl Naphthalene Sodium Sulfonate | 85 |
| Sulfonated White Oil | 5.5 |
| $C_{15}$ Polypropylene Sodium Sulfonate | 2.2 |

Detergency properties of the sulfonates derived from the specific polypropylene fractions were evaluated by tests which measure the ability of an agent to wet, disperse, and keep carbon black deflocculated in aqueous solutions. These tests correlate with washing characteristics, because a substance has greater detergency power in proportion to its ability to wet soil on a fabric, to disperse the soil promptly after its removal from the fabric by mechanical action, and to keep the soil in suspension.

Comparative detergency tests demonstrated that the sulfonates of the propylene pentamer and hexamer fractions are more efficient in certain respects than compared detergents which have had wide commercial acceptance. For example, they show higher dispersion and deflocculation efficiency compared to some of the commercial sodium alkyl sulfate detergents and higher wetting power compared to commercial sodium alkyl sulfonate detergents. Accordingly, they may be used as dispersing aids with the sulfate detergents and as wetting agent aids with the alkyl sulfonate detergents.

It will be noted that by specific selection of propylene polymer isomers boiling within a restricted range for the condensation reaction, a definitely more useful product of uniform characteristics is obtained with economy in materials and operations.

The polypropylene sulfonate wetting agents may be employed effectively in the textile field. They may be used as such or mixed with detergent builders such as inorganic salts, amines, amides, alcohols, glycols, and the like.

Since the amounts of the polypropylenes boiling within particular ranges can be controlled at will by the selective polymerization technique described and since it has been shown that certain fractions of the polymers thus obtained are amenable to a uniform reaction, a way is thus opened to prepare new products of controlled characteristics, such as are suitable especially for use as wetting agents, as detergent aids for one kind of detergent or another, or as chemical intermediates.

In accordance with the principles explained certain fractions of the polypropylenes may be reacted with other polar compounds such as oxyhalogen acids, nitrosyl chloride, oxides of nitrogen and sulfur, sulfur halides, hydrogen halides, hydrogen sulfide, and others to obtain specific products of uniform characteristics for a large variety of commercial purposes.

I claim:

1. A process for producing water-soluble tertiary alkenyl sulfonates of propylene polymers having 15 to 18 carbon atoms per molecule which comprises dissolving propylene polymers boiling within the range of 220° to 320° C. in a paraffinic hydrocarbon solvent, admixing chlorsulfonic acid and a dialkyl ether having about 4 carbon atoms per molecule with the resulting paraffinic hydrocarbon solution of the polymers, maintaining the resulting mixture at a temperature in the range of about −10° to +50° C., removing hydrogen chloride gas evolved from the solution, neutralizing the resulting mixture product in the solution with aqueous sodium hydroxide, separating water-soluble tertiary alkenyl sulfonates by extraction with an aqueous alcohol from the hydrocarbon solution, washing the aqueous alcohol extract of tertiary alkenyl sulfonates free of hydrocarbon naphtha-soluble materials with a naphtha hydrocarbon solvent, then drying the washed aqueous alcohol extract to recover the water-soluble tertiary alkenyl sulfonates as a solid.

2. A process for producing water-soluble tertiary alkenyl sulfonates of propylene polymers having 15 carbon atoms per molecule which comprises dissolving propylene polymers boiling within the range of 220° C. to 280° C. in a paraffinic hydrocarbon solvent, admixing chlorsulfonic acid and a dialkyl ether having about 4 carbon atoms per molecule with the resulting paraffinic hydrocarbon solution of the polymers, maintaining the resulting mixture at a temperature in the range of about −10° to +50° C., removing hydrogen chloride gas evolved from the solution, neutralizing the resulting mixture product in the solution with aqueous sodium hydroxide, separating water-soluble tertiary alkenyl sulfonates by extraction with an aqueous alcohol from the hydrocarbon solution, washing the aqueous alcohol extract of tertiary alkenyl sulfonates free of hydrocarbon naphtha-soluble materials with a naphtha hydrocarbon solvent, then drying the washed aqueous alcohol extract to recover the water-soluble tertiary alkenyl sulfonates as a solid.

LOUIS A. MIKESKA.

(References on following page)

REFERENCES CITED

The following references are of record in the file of this patent:

UNITED STATES PATENTS

| Number | Name | Date |
|---|---|---|
| 1,930,488 | Ramayya | Oct. 17, 1933 |
| 1,950,287 | Becker et al. | Mar. 6, 1934 |
| 2,037,229 | Gunther et al. | Apr. 14, 1936 |
| 2,152,162 | Tulleners | Mar. 28, 1939 |
| 2,160,343 | Ross | May 30, 1939 |
| 2,166,981 | Wiezevich et al. | July 25, 1939 |
| 2,214,051 | Gaylor | Sept. 10, 1940 |
| 2,219,748 | Nawiasky et al. | Oct. 29, 1940 |
| 2,240,920 | Werntz | May 6, 1941 |
| 2,365,783 | Suter | Dec. 26, 1944 |